United States Patent [19]

Gaudet et al.

[11] 3,930,770
[45] Jan. 6, 1976

[54] EXPANDABLE POINCON METHOD AND APPARATUS

[75] Inventors: David Alvin Gaudet, Cincinnati, Ohio; John Moss Wathen, Jr., Chester, N.J.

[73] Assignee: American Can Company, Greenwich, Conn.

[22] Filed: Feb. 24, 1975

[21] Appl. No.: 552,311

Related U.S. Application Data

[60] Continuation of Ser. No. 308,563, Nov. 21, 1972, which is a division of Ser. No. 72,083, Sept. 14, 1970, abandoned.

[52] U.S. Cl. ................. 425/107; 249/59; 425/438; 425/129 R
[51] Int. Cl.² .......................................... B29F 1/10
[58] Field of Search ...... 249/59, 83, 89; 425/129 R, 425/125, DIG. 14, 438, 107

[56] References Cited
UNITED STATES PATENTS

| | | | |
|---|---|---|---|
| 2,100,985 | 11/1937 | Smally | 425/125 |
| 2,644,198 | 7/1953 | Crawford | 425/306 |
| 2,763,910 | 9/1956 | Braatelien | 249/89 |
| 3,020,594 | 2/1962 | Makowski | 249/59 X |
| 3,110,931 | 11/1963 | Kadel | 425/107 |
| 3,125,801 | 3/1964 | Fields | 249/59 X |
| 3,313,875 | 4/1967 | Magerle | 425/129 R X |
| 3,330,006 | 7/1967 | Jenkins | 249/59 X |
| 3,373,479 | 3/1968 | Watt et al. | 249/59 X |

*Primary Examiner*—Francis S. Husar
*Assistant Examiner*—David S. Safran
*Attorney, Agent, or Firm*—Robert P. Auber; George P. Ziehmer

[57] ABSTRACT

An expandable poincon assembly to be used for forming a headpiece onto a preformed thin-walled plastic or laminate tube or bag provides a poincon upon which the loose fitting preformed thin-walled tube can be loaded. After tube loading, the poincon is inserted into a female forming member. Toward the end of the poincon's insertion stroke, a soupape which is mounted for axially movement within the head end of the poincon contacts the female forming member and then partially retracts into the head end of the poincon as the poincon continues to advance to the end of its insertion stroke. A conically-shaped washer mounted on the bottom end of the soupape is peripherally expanded by the continued advancement of the poincon after the top end of the soupape has contacted the female forming member. As the poincon reaches the end of its forward stroke, which will be the closed position of the poincon relative to the female forming member, the expanding periphery of the washer makes contact with the preformed tube body at a location below the portion of the tube body which extends beyond the poincon to effect a tight sealing fit between the poincon, the tube body and the female forming member to define a mold cavity in which the headpiece to the tube body may be formed.

6 Claims, 5 Drawing Figures

FIG. 2
FIG. 1
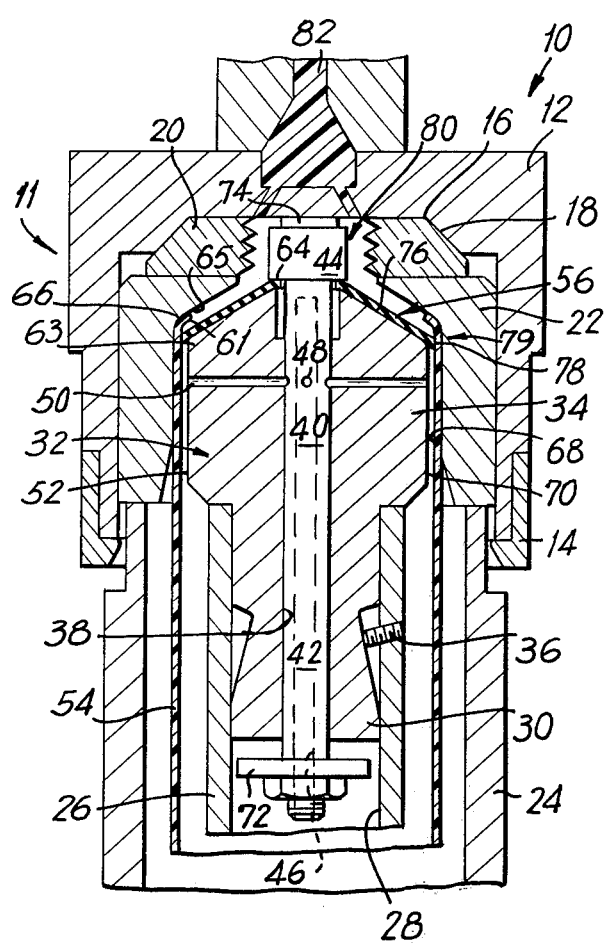
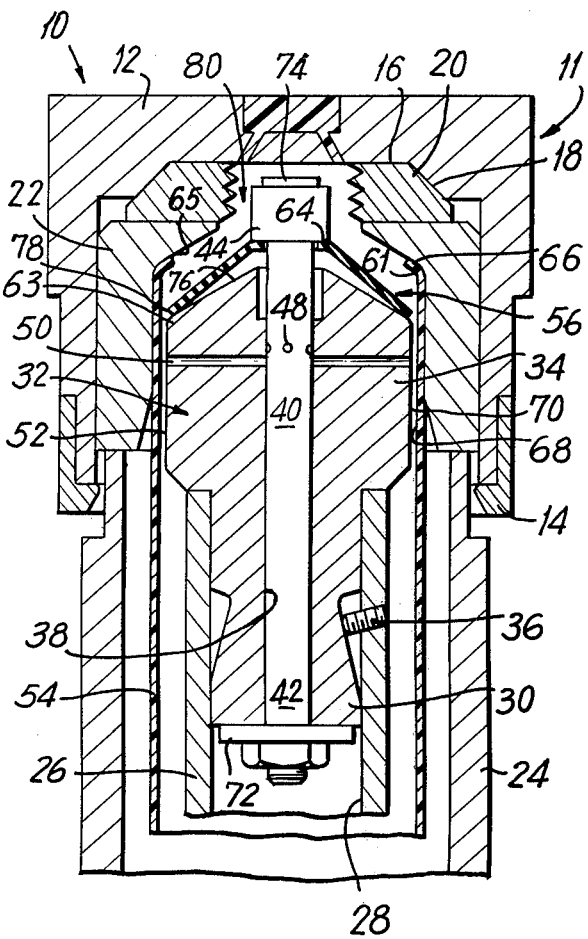
INVENTORS
DAVID ALVIN GAUDET
JOHN MOSS WATHEN, JR.
BY
Leonard R. Kohan

EXPANDABLE POINCON METHOD AND APPARATUS

This is a continuation of application Ser. No. 308,563, filed Nov. 21, 1972, which is a divisional application prior application Ser. No. 72,083, filed on Sept. 14, 1970, now abandoned.

BACKGROUND OF THE INVENTION

The present invention relates broadly to a method and apparatus for forming a headpiece on a preformed tubular body, and is more particularly concerned with providing a mold cavity in which to form a headpiece on a thin-walled preformed plastic or laminate tube, such as a bag intended for use in an aerosol can.

Various methods are used for forming a headpiece on a preformed tubular body. In one commonly-used method, a preformed tubular body is placed upon a poincon which had a diameter smaller than the inside diameter of the tubular body which allows a slight tolerance or clearance between the poincon and the tubular body. Then the poincon is inserted into an opposing female forming member such that the top end of the tubular body carried on the poincon extends beyond the head end of the poincon and abuts an inwardly curved inside surface of the opposing female member. The curved inside surface of the female member forms and bends or rolls the end of the tubular body inwardly effecting a tight sealing fit with the outside surface of the tubular body.

In order to prevent thermoplastic material from escaping through the tolerance or clearance between the inside surface of the tubular body and the poincon, or so-called "blow-up" of the molten material during the molding of the headpiece, it is necessary to maintain a tight sealing fit also between the poincon and the inside surface of the tubular body. Up to the present time, this has been accomplished by providing the inside surface of the female forming member, at a location directly opposite the top outer edge of the poincon, with a slightly smaller inside diameter than its overall inside diameter so that simultaneously as the poincon reaches the end of its insertion stroke this portion of the female member with the reduced diameter, together with the top outer edge of the poincon, will "squeeze" the tubular body to form a tight seal.

However, the above approach requires the maintenance of extremely precise tolerances and presents complications when one desires to automatically load preformed tubes onto the poincon, particularly, in the case of loading small tubes with thin-walled constructions, such as contemplated for use as bag elements in aerosol cans.

The present invention overcomes this problem by using a poincon, with a substantially undersized diameter relative to the inside diameter of the tube body, having an expandable washer at its head end. The use of this expandable washer, in conjunction with the undersized diameter of the poincon, enables a loose fitting installation of the tube body automatically onto the poincon prior to the headpiece forming operation.

The conically-shaped washer is normally in a contracted form, being retained by the bottom end of the cylindrical head of a soupape which is mounted for axial movement within the head end of the poincon. After the poincon with the tube body loosely fitted thereon is inserted into the female forming member and when it has moved therein toward its closed position relative to the female member at the end of its forward stroke, the top end of the cylindrical head of the soupape makes contact with the female member and depresses or retracts into the poincon as the poincon continues to advance forward to the end of the stroke. As the final advance of the poincon cause the soupape to retract, the head end of the advancing poincon expands the periphery of the washer to effect a peripheral contact of the washer with the inside diameter of the tube body establishing a tight sealing fit between the poincon, the tube body and the female forming member to define a mold cavity. While the forming elements are maintained in this position, molten thermoplastic material is introduced into the mold cavity to form the headpiece on the preformed tube body.

SUMMARY OF THE INVENTION

The present invention provides a method and apparatus for forming a headpiece on a preformed tubular body. A poincon having an undersized diameter is loosely fitted with the preformed tubular body. Provision is also made for air assist means within the poincon to lubricate the outside surface of the poincon concurrently as the preformed tube body is being loosely fitted on the poincon. Toward the end of the forward stroke of the poincon, a conically-shaped washer mounted on the bottom of the cylindrical head of a soupape, which is mounted for axial movement within the head of the poincon, peripherally expands when the top of the cylindrical head of the soupape contacts the female forming member and retracts into the poincon as the poincon continues to advance to the end of its stroke. The advancing head of the poincon actually forces the washer to peripherally expand. At the end of the forward stroke, the poincon has assumed a closed position in relation to the female forming member and the periphery of the expanding washer has contacted the tube body to effect a tight sealing fit between the poincon, the tube body and the female member to define a mold cavity in which the headpiece is subsequently formed by the introduction of molten thermoplastic material therein.

DESCRIPTION OF THE DRAWINGS

FIG. 1 is a vertical sectional view through the forming apparatus showing the conical, expandable washer in its initial contracted position;

FIG. 2 is a vertical sectional view through the forming apparatus showing the conical, expandable washer in its expanded position just before introduction of the molten thermoplastic material to form the headpiece on the preformed tube body;

DESCRIPTION OF THE PREFERRED EMBODIMENT

Figure 3:
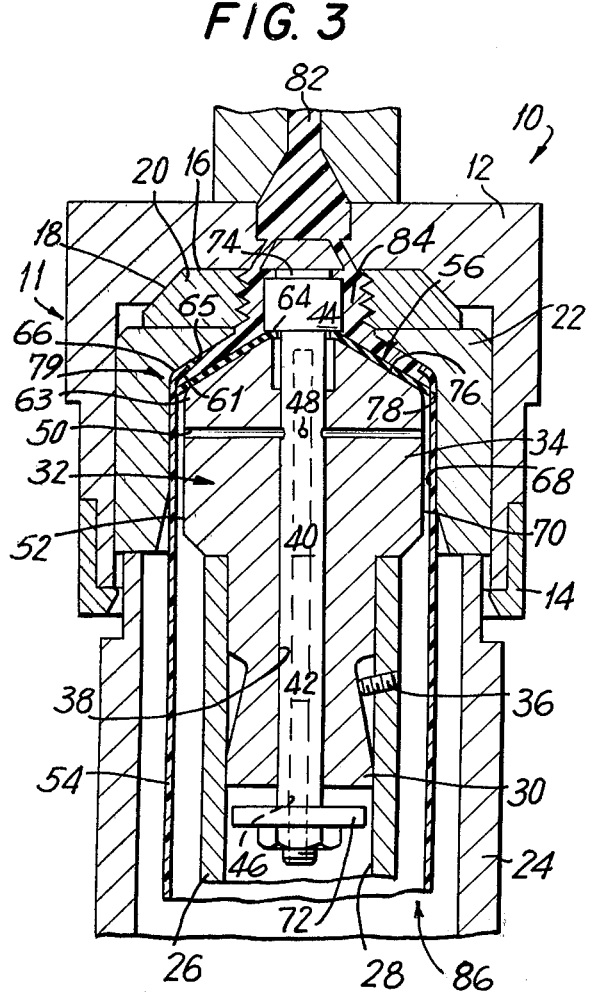
FIG. 3 is a vertical sectional view through the forming apparatus showing the conical, expandable washer in its expanded position just after formation of the headpiece.

In FIG. 1 of the drawings, forming apparatus, generally designated 10, is shown embodying the novel concept of the present invention. The apparatus 10 comprises in the exemplary embodiment illustrated a female forming member, generally designated 11, having a stationary die housing 12 which may be formed of separable parts retained in position by a ring member 14. The housing 12 is of generally an inverted cup shape and interiorly thereof is provided with a flat wall 16 and an inclined wall 18 which receive an external neck forming means 20 taking the form of a plurality of separable thread plates spring-pressed outwardly in a manner known to the art.

The resilient force urging the thread plates 20 outwardly is opposed by a collar member, or matrice, 22 retained within the die housing 12 by the ring member 14, the matrice 22 being maintained in the position of FIG. 1 by an outer movable sleeve member, or chemise, 24. The chemise 24 is supported in a known manner, such as that shown in U.S. Pat. No. 3,207,833 which issued on Sept. 21, 1965.

An inner sleeve member, or manchon, 26 is axially passaged as at 28 and receives therein the stem portion 30 of an internal shoulder forming member, or poincon, generally designated 32, shown as also having an enlarged head portion 34 engageable with the upper end of the manchon 26. The manchon 26 and the poincon 32 are bolted or otherwise secured together by a set screw 36 so as to be movable in unison.

The poincon 32 has a central passageway 38 in which is axially movably mounted an internal neck forming member, or soupape, generally designated 40, which has a hollow stem portion 42 and a substantially cylindrical head portion 44. The hollow stem portion 42 of the soupape 40 has a central bore 46 and openings 48 which communicate with channels 50 through the head portion 34 of the poincon 32 by which path an air flow is used to "lubricate" the outside surface 52 of the poincon 32 during the loose fitting installation of a tube body 54 onto the poincon 32 prior to the headpiece forming operations which will be described hereinafter.

Figure 5:
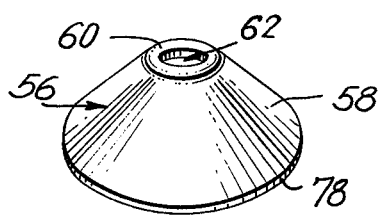
FIG. 5 is a perspective enlarged view of the conical, expandable washer.

An expandable BELLEVILLE washer, generally designated 56, shown separately in FIG. 5, which has a conically-shaped wall 58 and a flat top 60 with a center hole, generally designated 62, therein is secured by conventional means to the peripheral bottom end 64 of the cylindrical head portion 44 of the soupape 40, with the stem portion 42 of the soupape 40 extending through the hole 62 of the washer 56.

Figure 4:
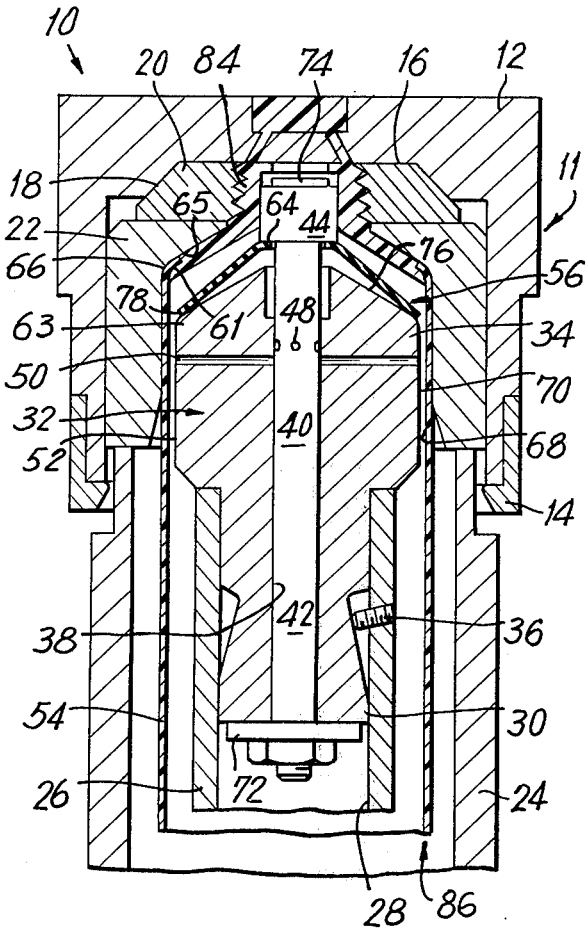
FIG. 4 is a vertical sectional view through the forming apparatus showing the conical, expandable washer in its final contracted position.

In FIGS. 1 and 4, the washer 56 appears in its normal or contracted position, while in FIGS. 2 and 3, it appears in its expanded position. The washer 56 is actuated between these two positions through contact of its conically-shaped wall 58 with the head portion 34 of the poincon 32 during axial movement of the poincon 32 in relation to the female forming member 11 when the poincon 32 is close to the end of its inward stroke within the female member 11, or, in other words, when the poincon 32 and the female member 11 have nearly assumed a closed relationship or position.

The poincon 32 is axially movable relative to the female member 11 under the action of suitable hydraulic or pneumatic means or the like (not shown).

When the poincon 32 with the tube body 54 loosely fitted thereon is inserted into the female forming member 11, the top end 61 of the tube body 54 extends beyond the outer edge 63 of the head end 34 of the poincon 32 and abuts an inwardly curved inside surface 65 of the opposing female member 11. The curved surface 65 of the female member 11 forms and bends the top end 61 of the tube body 54 inwardly effecting a tight sealing fit with the outside surface 66 of the top end 61 of the tube body 54. However, if it was not for the provision of the washer 56, there would be no sealing fit between the inside surface 68 of the tube body 54 and the outside surface 70 of the head end 34 of the poincon 32, in view of the fact that the tube body 54 was initially loosely fitted onto a poincon 32 having an undersized diameter relative to the inside diameter of the tube body 54.

The soupape 40 has a spacer ring 72 at the bottom end of its hollow stem portion 42 which regulates the amount of peripheral expansion which the washer 56 may undergo. Normally the resiliency of the washer 56 to retain its unexpanded or contracted condition, causes the axially movable soupape 40 to maintain what may be termed an "up" position as shown in FIGS. 1 and 4. In this position the spacer ring 72 is flush against the bottom of the poincon 32. As shown in FIGS. 2 and 3, the soupape 40 is in a "down" position, such resulting from the movement of the poincon 32 into a closed position relative to the female forming member 11. When the poincon 32 reaches this closed relationship, a kiss-off element 74 on the top of cylindrical head portion 44 of the soupape 40 makes contact with the die housing 12 of the female forming member 11 and terminates the upward or forward movement of the soupape 40 while the poincon 32 still continues to move forward. From this point on, only the poincon 32 moves upward or forward, all the while, peripherally expanding the washer 56 as it moves forward until it reaches the end of its insertion stroke at which time the upper surface 76 of the poincon head 34 becomes contiguous with the conically-shaped wall 58 of the washer 56. At this point, the outer peripheral edge 78 of the washer has contacted the inside surface 68 of the tube body 54 adjacent to the top end 61 of the tube body 54 and has functionally effected a tight sealing fit, generally designated 79, between the poincon 32, the tube body 54 and the female forming member 11 to define a mold cavity 80, generally designated, into which molten thermoplastic material 82 is subsequently introduced to form the headpiece 84 of the tube body 54.

Following the formation of the headpiece 84, the poincon 32 is partially retracted out of the female forming member 11 causing the washer 56 to contract or return to its normal position, as shown in FIG. 4, and the formed article is ejected from the female forming member substantially as described in U.S. Pat. No. 3,207,833.

It is thought that the invention and many of its attendant advantages will be understood from the foregoing description and it will be apparent that various changes may be made in the form, construction and arrangement of the parts and that changes may be made in the steps of the method described and their order of accomplishment without departing from the spirit and scope of the invention or sacrificing all of its material advantages, the form hereinbefore described being merely a preferred or exemplary embodiment thereof.

We claim:

1. Apparatus for molding a headpiece on a tubular body, comprising:
   a female forming member having a surface defining a mold cavity with an opening thereinto, said cavity being configured to define the external surface of a headpiece;

a washer configured to define at least a portion of the internal surface of a headpiece, said washer being expandable to dispose a continuous peripheral portion thereof in close proximity to said cavity-defining surface;

means for disposing said washer within said cavity of said forming member adjacent said opening thereinto said female forming member and said washer cooperatively defining at least a portion of a headpiece forming space in said apparatus;

means for expanding said washer; and means for introducing a flowable synthetic resinous material into said headpiece-forming space, said apparatus being adapted to receive an open-ended tubular body with the open end thereof seated within said cavity adjacent said opening thereinto, and with said washer at least partially disposed within the tubular body adjacent its open end so that, upon expansion of said washer, said peripheral portion thereof may be urged into sealing engagement with the inner surface of the tubular body, in turn urging the outer surface of the tubular body into sealing engagement with said cavity-defining surface, the tubular body thereby sealing said forming space and cooperatively defining a mold cavity therewith, for forming a headpiece on the body.

2. The apparatus of claim 1 wherein said female forming member has a passageway thereinto at a location spaced from said opening, to provide said resin-introducing means.

3. Apparatus for molding a headpiece on a tubular body, comprising:

a female forming member having a mold cavity with an opening thereinto, said cavity being configured to define the external surface of a headpiece;

a male member supported for movement between a withdrawn position, and an inserted position with one end disposed within said cavity;

a generally conical hollow washer disposed on said male member adjacent said one end thereof and configured to define therewith the internal surface of a headpiece, said washer being expandable to dispose, in said inserted position of said male member, a continuous circumferential portion thereof in close proximity to the cavity-defining surface of said forming member adjacent said opening and to define, in cooperation with said cavity-defining surface, a headpiece-forming space therebetween;

means for expanding said washer; and means for introducing a flowable synthetic resinous material into said headpiece-forming space, said male member being adapted for mounting of an open-ended tubular body thereon with said washer disposed therewithin adjacent an open end thereof, and said female member being adapted to receive the body with the open end thereof seated within said cavity adjacent said opening thereinto so that, in said inserted position of said male member, said circumferential portion of said washer may be urged by said expanding means into sealing engagement with the inner surface of the body, in turn urging the outer surface of the body into sealing engagement with said cavity-defining surface, the tubular body thereby sealing said forming space and cooperatively defining a mold cavity therewith, for forming a headpiece on the body.

4. The apparatus of claim 3 wherein said female forming member has a passageway thereinto at a location spaced from said opening, to provide said resin-introducing means.

5. The apparatus of claim 3 wherein said male member comprises an elongated body having an axial bore extending therethrough, and a post slidably received therewithin and having an end portion protruding from a first end thereof at said one end of said member, wherein said washer is mounted on said end portion of said post with its apex disposed away from said elongated body, and wherein said first end of said body is configured to spread said washer upon engagement therewith, so that relative sliding movement of said post toward said elongated body may cause said washer to engage said first end, to thereby effect expansion of said washer.

6. The apparatus of claim 5 wherein said male member has at least one channel extending from said axial bore to an outer surface thereof, and wherein said axial bore communicates with an air source, so that air may be supplied through said channel to said outer surface of said male member, to thereby lubricate said male member and assist in the facile mounting of a tubular body thereon.

* * * * *